Patented Oct. 17, 1950

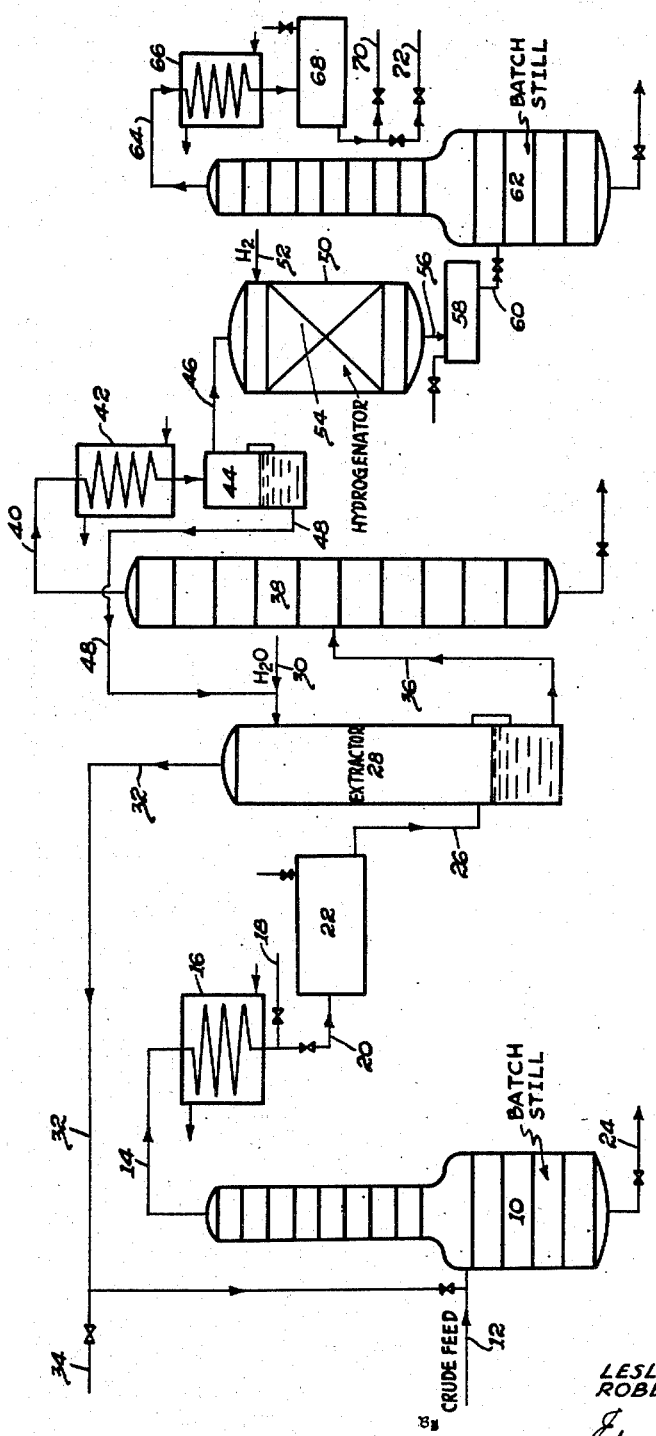

2,525,829

UNITED STATES PATENT OFFICE 2,525,829

RECOVERY OF ETHYL ACETATE FROM BUTADIENE CRUDE BY-PRODUCT OILS

Leslie W. Royer, Aliquippa, and Robert L. Iverson, Beaver Falls, Pa., assignors to Koppers Company, Inc., Pittsburgh, Pa., a corporation of Delaware Application December 4, 1946, Serial No. 713,900

4 Claims. (Cl. 202—57)

This invention relates to refining ethyl acetate. More particularly the invention relates to the separation and refining of ethyl acetate from crude byproduct oils obtained in the manufacture of butadiene.

In the manufacture of butadiene from ethyl alcohol two main reactions are involved: first, ethyl alcohol is dehydrogenated to form acetaldehyde and, second, a mixture of acetaldehyde and ethyl alcohol is dehydrated to form butadiene. In these reactions many compounds are formed and it is difficult to separate ethyl acetate from these compounds by careful fractional distillation because of the closely related boiling points of the contaminating compounds and the formation of azeotropes by the compounds.

For example, a closely fractionated distillate recovered from butadiene manufacture has the following composition:

|  | Per Cent By Weight | Boiling Point, °C. |
|---|---|---|
| Ethyl Acetate | 15.6 | 77.1 |
| Aldehydes (principally butyraldehyde) | 0.9 | 75.7 |
| Alcohols (principally ethanol) | 1.6 | 78.4 |
| Hydrocarbons (principally hexadiene and hexenes) | 78.0 | 73-82 |
| Water | 1.2 | 100 |
| Higher esters | 1.7 |  |

We have found that a substantial purification of the above mixture may be effected by dry distillation and water extraction wherein the ethyl acetate, alcohols and aldehydes may be separated from the water-insoluble hydrocarbons. After water extraction, the impurities associated with the ethyl acetate are traces of hexadiene, aldehydes and alcohols. A hydrogenation of this mixture will convert the aldehydes and hexadiene to alcohols and hexane, respectively. These compounds have such boiling points that they may be readily separated from the ethyl acetate by fractional distillation.

The primary object of the present invention is to provide a process of refining crude byproduct oil from butadiene manufacture to recover a highly purified ethyl acetate.

Another object of the invention is to provide a process by which the contaminants associated with crude byproduct oils of butadiene manufacture may be converted to products which may be readily separated from ethyl acetate by distillation.

A further object of the invention is to provide a process by which the contaminants in a byproduct oil containing ethyl acetate may be treated to permit the ethyl acetate to be separated therefrom in a highly refined condition by simple distillation.

With these and other objects in view, the invention consists in the refining of byproduct oil from butadiene manufacture for the recovery of a purified ethyl acetate therefrom.

The various features of the invention are illustrated in the accompanying drawing which is a diagrammatic flow sheet of an apparatus in which the preferred process of the invention may be carried out.

The byproduct oil as it is recovered from the fractionation of butadiene contains an average content of ethyl acetate of 15 to 17% by weight. The ethyl acetate concentration may be increased by fractionation.

Referring to the drawing, the crude butadiene oil is introduced into a batch still 10 through a line 12. The crude oil is dry distilled in still 10; the first vapors passing overhead from the still through a line 14 and condenser 16 are removed through line 18. These constituents are the lighter hydrocarbons, most of the ethanol and traces of ethyl acetate. It is important that the distillation should be carried out as a dry distillation because by this means a more complete separation of the ethanol or alcohols may be effected. After the lower boiling point materials come overhead, the ethyl acetate is passed through a line 20 into an accumulator 22. The material collected in accumulator 22 has an ethyl acetate concentration of approximately 57% by weight. From the base of the still 10 may be removed the still butts through a line 24, which are composed principally of heavy hydrocarbons.

After the ethyl acetate solution has been concentrated in the still 10 and collected in accumulator 22, the product is passed through a line 26 into a water extractor 28. Water is introduced near the top of the extractor through a line 30 and passes downwardly through the extractor while the ethyl acetate solution passes upwardly through the water. In this countercurrent scrubbing operation the ethyl acetate, alcohol and some hexadiene are dissolved in the water and this water solution accumulates at the bottom of the extractor 28. The overhead composed principally of hydrocarbon oils, and about 15% ethyl acetate, passes out of the top of the extractor through a line 32 and may be sent back to the crude line 12 to be again distilled or rejected from the process through a line 34. In the extractor 28 a water circulation of approximately 20 volumes of water per volume of feed oils is used. It is desirable, however, to avoid an excess amount of water because this water has to be separated from the ethyl acetate in the refining operation. It is found, also, that the water extractor operates more efficiently when it is operated continuously and, therefore, the ethyl acetate solution is accumulated into a comparatively large body for the extraction process.

The ethyl acetate-water solution passes to the bottom of the extractor 28 and flows through a line 36 into the mid portion of a continuous still 38. The overhead stream from the still 38 is composed principally of ethyl acetate about 91.5% by weight, aldehydes 2.3% by weight, hexadiene 1% to 2% by weight and water. This overhead stream passes through a line 40 into a condenser 42 and collects in a separator 44. The mixture of ethyl acetate, aldehyde and hexadiene flows out of the upper portion of the separator through a line 46 and the water solution is removed from the bottom of the separator through a line 48. The line 48 connects with the water line 30 so that any ethyl acetate in the water is recovered in the extractor. The residue leaving the bottom of still 38 is water.

The ethyl acetate solution which passes through the line 46 flows into the upper portion of a hydrogenator 50 where it is met by a stream of hydrogen introduced into the upper portion of the hydrogenator through a line 52. A bed 54 of pelleted nickel hydrogenation catalyst is maintained in the hydrogenator 50 so that the ethyl acetate and hydrogen pass downwardly through the catalyst bed. If desired, the ethyl acetate solution flowing through a line 46 may pass through a heater to raise it to any desired temperature. Furthermore, the hydrogenation should be carried out under a pressure of 25 to 100 lbs. per square inch, preferably 40 lbs. per square inch, and at a temperature of 80° C. In the hydrogenation reaction the aldehydes are converted to alcohols, principally butanol which boils at 117° C., and the traces of hexadiene are converted to hexane boiling at 69° C. Since the ethyl acetate boils at 77° C., it can be seen that this mixture has sufficiently separated boiling points to permit them to be separated by a good fractional distillation.

The hydrogenated mixture composed of ethyl acetate, butanol and hexane passes through a line 56 into an accumulator 58. After being collected in the accumulator, this material may be passed through a line 60 into a batch still 62. The first vapors passing overhead from the still 62 flow through a line 64 into condenser 66 into an accumulator 68. This first overhead material is composed principally of water, saturated hydrocarbons and a small amount of ethyl acetate and is removed through a line 70. The material flowing through the line 70 may be added to the line 26 going into the extractor 28, in order to recover the ethyl acetate therein. After the first run is removed, the line 70 is closed and ethyl acetate is then removed through a line 72. The stream removed through the line 72 contains from 98% to 100% ethyl acetate and represents a recovery of more than 90% of the ethyl acetate originally present in the feed stock.

The feed to the batch still 62 contains 4 to 5% by volume of water. This water is removed in the heads cut and the remainder of the distillation, including the recovery of the greater portion of the ethyl acetate is conducted as a dry distillation. This water promotes the accumulation of the hydrocarbon impurities in the heads cut and therefore is considered to be an important step in the process.

The preferred form of the invention having been thus described, what is claimed as new is:

1. A process of recovering ethyl acetate from crude butadiene byproduct oils containing ethyl acetate, alcohols, aldehydes, hydrocarbons, higher esters and water, comprising: distilling the crude product to recover a distillate composed principally of ethyl acetate, aldehydes, hexadiene and water, extracting the distillate with water to separate a water solution containing ethyl acetate, aldehydes, and hexadiene, concentrating the water extract by distillation to recover an overhead distillate containing ethyl acetate, aldehydes and hexadiene, hydogenating the overhead distillate to convert the aldehydes to alcohols and the hexadiene to hexane and distilling the hydrogenated product to recover a purified ethyl acetate.

2. A process of recovering ethyl acetate from a crude butadiene byproduct oil containing ethyl acetate, alcohols, aldehydes, hydrocarbons, higher esters and water comprising: distilling the crude byproduct to recover a distillate composed principally of ethyl acetate, aldehydes, hexadiene and water, extracting the distillate with water to separate a water solution containing ethyl acetate, aldehydes and hexadiene, concentrating the water solution by distillation to recover an overhead distillate containing ethyl acetate, aldehyde and hexadiene, hydrogenating the overhead distillate in the presence of a hydrogenation catalyst to convert the aldehydes to alcohols and the hexadiene to hexane, and distilling the hydrogenation product in the presence of 4% to 5% by volume of water to recover a purified ethyl acetate.

3. The process defined in claim 1 in which the crude oil is dry distilled to concentrate the ethyl acetate content.

4. The process defined in claim 1 in which the distillation of the hydrogenated product is carried out in the presence of water.

LESLIE W. ROYER.
ROBERT L. IVERSON.

REFERENCES CITED

The following references are of record in the file of this patent:

UNITED STATES PATENTS

| Number | Name | Date |
| --- | --- | --- |
| 2,043,688 | Woodhouse | June 9, 1936 |
| 2,062,837 | Sheely | Dec. 1, 1936 |
| 2,395,057 | Marsh | Feb. 19, 1946 |
| 2,403,743 | Hitchcock | July 9, 1946 |